UNITED STATES PATENT OFFICE.

MARY S. BORDEN, OF NEW YORK, N. Y.

TOILET CREAM.

No. 853,436.  Specification of Letters Patent.  Patented May 14, 1907.

Application filed September 28, 1906. Serial No. 336,557.

*To all whom it may concern:*

Be it known that I, MARY S. BORDEN, a citizen of the United States, residing at New York city, in the county and State of New York, have invented a certain new and useful Toilet Cream, of which the following is a full, clear, and exact specification, sufficient to enable others skilled in the art to make and use the same.

My invention has relation particularly to that variety of compositions used in contact with the skin of persons or animals for producing certain results.

The object of my invention is to provide or produce a new and useful composition, which, when applied to the skin, will protect the covered part from the air and at the same time operate as a cleanser or purifier for the removal of foreign matters or accumulations.

To accomplish the object of the invention above stated, and to secure other and further useful results, my invention involves a new and useful composition of matter in the form of a mixture of different ingredients, as will be fully explained.

My compound embraces the following ingredients united in about the proportions stated, viz.:—6 pounds of washing soap, 14 pounds of water, 1 ounce of extract of bladder-wrack (*Fucus vesiculosus*), ¼ pounds of salt, 1 ounce of carbonate or sulfate of soda, 135 grains of sulfate or carbonate of potassa, 30 grains of thyroid, (thyroid gland of sheep) ¼ ounce of tincture of iodin, ½ ounce of perfume. These ingredients are heated and incorporated one with the other and worked up into a soap-paste or cream and applied to the skin after the manner of applying ordinary soap pastes.

The composition is of great efficiency in cleansing and purifying the skin. The perfume is added only when the composition is desired for use upon the human skin, and it may be omitted when the composition is intended for other use. The proportions of the ingredients are those most approved in the manufacture of my composition and may be varied within the usual limits without departing from my invention.

Having now fully described my invention, what I claim as new herein and desire to secure by Letters Patent, is:—

1. The herein described composition of matter for use as a soap-paste or cream, comprising soap, water, extract of bladder-wrack, chlorid of sodium, carbonate of potassium, carbonate of sodium, thyroid and iodin, combined substantially in the proportions stated.

2. The herein described process for the manufacture of a composition of matter, which consists in bringing together soap, water, extract of bladder-wrack, chlorid of sodium, carbonate of potassium, carbonate of sodium, thyroid and iodin in substantially the proportions stated, heating the same and beating the resulting mass into a paste or cream.

In testimony whereof, I have signed my name to this specification in the presence of two subscribing witnesses.

MARY S. BORDEN.

Witnesses:
JAMES H. GRIFFITH, Jr.,
GARRETT Z. DEMAREST, Jr.